March 21, 1961 C. R. NYBAKKE 2,975,940
WHEELED VEHICLE FOR DISPENSING FLOWABLE MATERIAL
Filed May 15, 1959

Clifford R. Nybakke
INVENTOR

BY Ramsey and Kolisch
Attys.

2,975,940

WHEELED VEHICLE FOR DISPENSING FLOWABLE MATERIAL

Clifford R. Nybakke, Newberg, Oreg., assignor to Oregon Nut Growers, Inc., Newberg, Oreg., a corporation of Oregon Filed May 15, 1959, Ser. No. 813,406

9 Claims. (Cl. 222—177)

This invention relates to wheeled vehicles for dispensing flowable materials, and more particularly to trailer-type vehicles used by farmers and orchardists in applying fertilizers, sprays, dusts, and the like over large areas.

In dispensing such material, it is common to use a mobile trailer frame with a tank for carrying the material and equipped with distributing conduit means connected to the tank. Material is dispensed under pressure, and thus some form of power-driven pump mechanism is provided for forcing material through the conduit means and out from the tank. Usually such a pump is powered by a ground-engaging wheel, equipped with a wheel sprocket which drives a chain. The speed of rotation of this wheel changes when the trailer frame turns a corner, increasing or decreasing depending upon whether the wheel is on the outside or the inside of the turn. As a result, the power delivered to the pump varies, and so also does the pressure produced by the pump. In most operations it is desirable to have the same expanse of ground covered regardless of turning movement of the trailer frame, and this is a decided advantage.

As another consideration, most pumps used for pumping material from the tank require relatively high speeds of rotation in their actuating shafts. For this reason, complicated gear trains and sprocket arrangements have been provided to produce a suitably stepped-up gear ratio between the driving gear connected to the ground-engaging wheel and the shaft actuating the pump unit. The use of extensive gear trains makes for high maintenance costs and results in high initial cost for the original equipment. Due to the expense involved, the usual farmer or orchardist has preferred not to own any such piece of equipment, but to lease it only when needed. The price of the equipment rented has, however, reflected the seasonal demand for the item.

To take care of these difficulties, applicant contemplates an applicator vehicle for sprays, fertilizers and the like which is simple in construction and easy to maintain in operating condition. The invention primarily concerns the power transmission means used in supplying driving power to the pump from the ground-engaging wheels of the vehicle. Other features of the invention comprise a novel system for agitating the contents of the tank that is normally part of the vehicle, and a novel means for driving the agitator. Thus in an embodiment of the invention, applicant provides a mobile vehicle having a pair of laterally disposed support wheels. These support wheels, instead of rotating on dead axles, are connected to a pair of aligned rotatable wheel axles set end to end. The adjacent ends of these wheel axles are joined by differential gearing which includes an epicyclic gear movable in an orbit about the axes of the wheel axles. The pump unit for the vehicle is driven by a drive shaft operatively connected to the wheel axles through the epicyclic gear of the differential gearing. As a result of the differential gearing, the speed of the drive shaft for the pump is always equal to the algebraic mean of the speeds of the two wheel shafts. This produces an even drive to the pump, regardless of whether the trailer is turning to right or left.

The differential gearing includes a step-up gear between the epicyclic gear and the drive shaft for the pump. This step-up gear is effective to produce a substantially greater speed of rotation in the drive shaft than the speed of orbital movement of the epicyclic gear. The need for an extensive gear train for producing a stepped-up gear ratio is eliminated. The stepped-up gear ratio in effect is produced in gearing of the differential itself.

Many solutions which are used in treating crops or soil have solids carried in suspension which tend to sink to the bottom of the suspending medium if not agitated. Thus the construction features an elongated tank extending longitudinally of the trailer frame, and an agitator rotatable about an axis extending longitudinally of the tank. This agitator is positioned near the base of the tank, and on rotation is effective thoroughly to mix the contents of the tank. The agitator has a propeller shaft that extends outwardly from the tank and is substantially parallel to the drive shaft for the pump. By thus positioning the propeller shaft relative to the pump drive shaft, one may drive the other, and the need for complicated power-transmitting mechanism between the two shafts is eliminated. A chain may be used directly to connect the two.

Other features, objects and advantages are attained by the invention, described below in the following description that is to be read in conjunction with the accompanying drawings, wherein.

Figure 1:
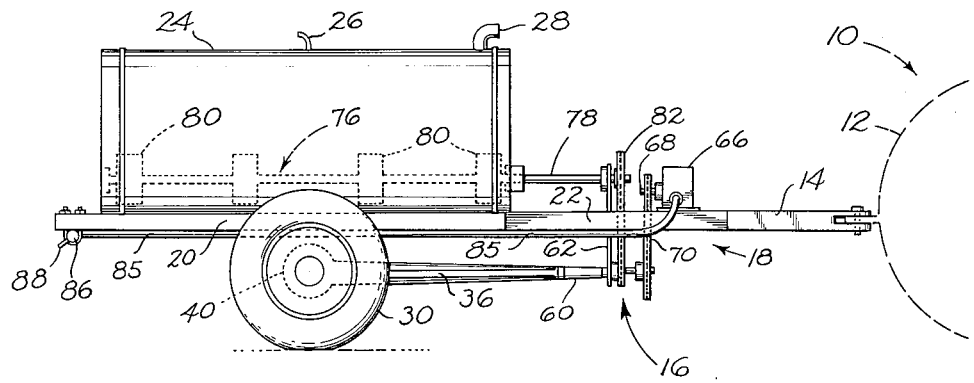
Fig. 1 is a side elevation of a trailer unit constructed according to an embodiment of this invention.
Figure 2:
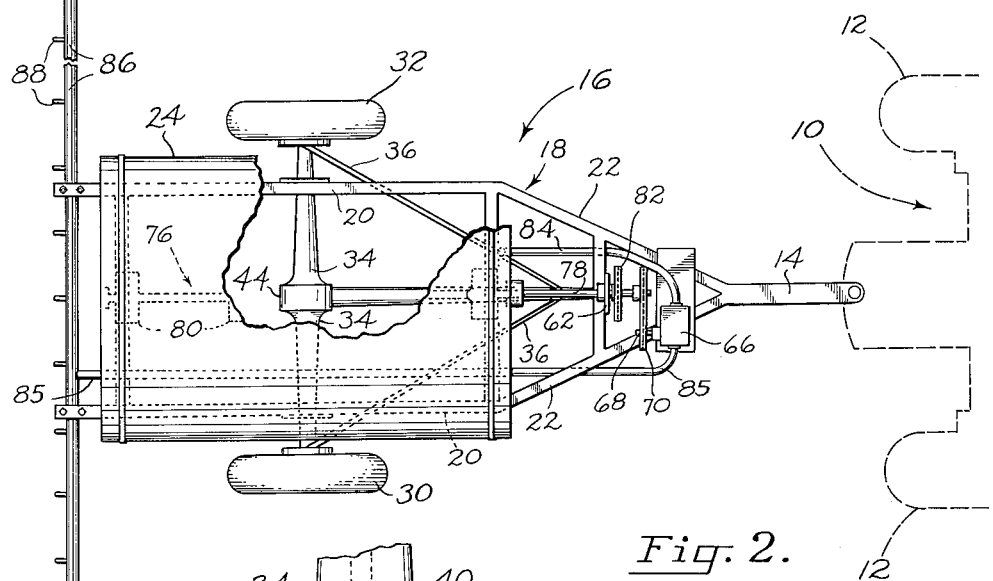
Fig. 2 is a plan view looking down at the apparatus in Fig. 1, with portions of the structure removed to illustrate details.

The construction illustrated and described is intended for use as an above ground sprayer. The construction obviously may be modified, however, to make it suitable for use as a sub soil applicator, or as a duster, or for a similar type of operation. It should be understood that what is described herein is only an embodiment and that various modifications will suggest themselves to those skilled in the art.

Referring now to the drawings, indicated in dotted outline at 10 is a tractor employed in pulling the trailer unit to be described over the ground. The tractor may take any conventional form, and has lateral traction wheels 12 which move the tractor over the ground. Centrally of the rear of the tractor is a hitch mechanism which is attached to tongue portion 14 of a trailer unit indicated generally at 16.

With reference now to the construction of trailer unit 16, this comprises a frame 18 with side members 20 disposed on either side of the frame and connected at their forward ends by A-frame structure 22. Tongue portion 14 protrudes forwardly from the A-frame structure. Extending longitudinally of the trailer frame and supported on the top over the longitudinal center thereof is an elongated tank 24 of substantially oval cross section. The tank is used to carry the liquid material that is to be dispensed. The tank is provided at its top with vents 26 and 28 used in filling the tank. Trailer frame 18 is supported for movement over the ground by a pair of laterally disposed support wheels 30 and 32.

Considering now the mounting for the support wheels, extending tranversely of frame 18 and secured to the underside thereof is an axle housing 34. The axle housing is made rigid on the underside of the frame by means of diagonal struts 36. Within the hollow interior of housing 34 are a pair of aligned wheel axles or shafts indicated at 40 and 42 (see Fig. 3). These have their outer ends secured in a suitable manner to the wheels, and thus rotate with the wheels. The adjacent set of ends of the wheel shafts are operatively interconnected by means of differential gearing enclosed within a differential housing 44.

Figure 3:
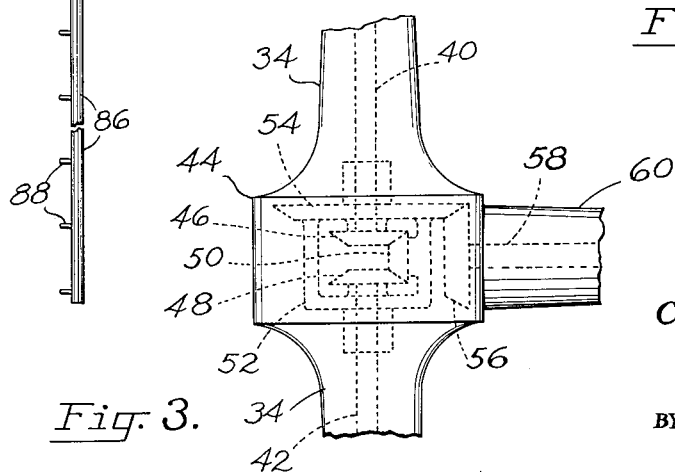
Fig. 3 is a simplified view illustrating a conventional type of differential such as may be used in the invention to connect the wheel axles and drive shaft for the pump.

For a description of suitable differential gearing, and now referring to Fig. 3, affixed to the adjacent set of ends of the wheel axles are opposed bevel gears 46, 48. Meshing with these bevel gears is a differential pinion 50, which is contrained to movement bodily around the circumference of gears 46, 48 and the axes of axles 46, 48. Specifically, pinion 50 is rotatably mounted on a bearing case 52 which has the ends of wheel axles 40, 42 journaled therein. Integral with bearing case 52 is a driving gear 54. Driving gear 54 meshes with a driving pinion 56, and the latter is secured to one end of a drive shaft 58. The drive shaft is substantially parallel to the longitudinal center of frame 18 and extends forwardly from the axle housing through a housing 60. The forward end of shaft 58 is located forwardly and below tank 24. Housing 60 is fixed in place at its forward end by a brace 62.

The differential and associated structure just described is conventional and resembles the differential at the rear end of the usual automobile. In fact, discarded "rear ends" of used automobiles are ideally suited for the construction of the trailer. Such units are readily available at low cost.

As is true of any differential gearing, the gearing compensates for differences in the movement of shafts connected thereto. In the construction described, the differential produces a speed of rotation in the drive shaft 58 which is equal to the algebraic mean of the speeds of the two wheel shafts 40, 42. If the trailer travels in a straight line, wheel shafts 40, 42 rotate at the same speed, and this causes the differential pinion 56 to be moved bodily in a circular orbit extending about the axes of the wheel shafts, and rotation of driving gear 54 at the same speed. If one of the wheel shafts should slow down due to turning movement of the trailer and by reason of the fact that it is connected to the inside wheel, the rotation speed of the bevel gear connected thereto is reduced the same amount. The speed of rotation of the outside wheel increases on a turn by the same amount that the speed of the other wheel decreases. This then causes the shaft of the outside wheel to increase its speed, which compensates for the slow down of the other shaft. The result is that shaft 58 is driven at substantially the same speed as before the turn was started.

In the construction, driving gear 54, it will be noted, is somewhat larger than driving pinion 56. In the usual automobile differential, the gear ratio between the gears will be in the range of 5 to 6 to 1. Thus a step-up occurs in the gear train connecting gear 50 to drive shaft 58, i.e., driving gear 54 and driving pinion 56.

At the forward end of the unit, there is a pump 66 which is powered by an actuating shaft 68 substantially parallel to drive shaft 58. The two shafts are connected by sprockets and chain 70. The step-up occurring in the differential is sufficient to cause a conventional pump to be driven at suitable speeds using a direct chain connection between the drive shaft and pump shaft and moving the trailer at ordinary tractor speeds.

Considering now details of the tank construction, extending longitudinally of the tank substantially parallel to its center axis is a rotatable agitator indicated at 76. This includes a propeller shaft 78 which projects from the forward end of the tank. Affixed to the propeller shaft are blades 80. The agitator is located near the bottom of the tank, and on rotation the blades 80 serve constantly to agitate any liquid contained therein and thoroughly mix the same. The propeller shaft is substantially parallel to drive shaft 58, and is drivingly connected to the forward end of the drive shaft as by sprockets and chain 82.

Liquid is forced from the tank to an ejection mechanism at the rear of the trailer through a conduit means comprising a conduit section 84 connected to the tank and to the inlet side of pump 66, and a conduit section 85 connected to the outlet of pump 66 and to the ejection mechanism. The latter comprises an elongated and rigid tube 86 that is provided with plural discharge orifices indicated at 88. The ejection mechanism is conventional, and the particular type employed forms no part of this invention. The conduit sections, pump and ejection mechaism constitute a dispensing system in the trailer unit.

The construction described has several advantages. The drive to the pump from the laterally disposed ground-engaging wheels is enclosed within housing structure, and thus the transmission and associated shafts are protected from dirt and dust and lubrication problems are minimized. The differential is operable to supply a constant drive to the pump, with no loss of power in the pump resulting on turns. Thus the distribution from the unit remains steady regardless of turns. There are no exposed chains or sprockets carried at or near the wheels that would tend to become encumbered with weeds, grass, etc. The only gear trains outside the housing comprise the chain drive for the agitator and pump at the forward end of the unit. The unit is light in weight and easy to pull.

It is claimed and desired to secure by Letters Patent:

1. A wheeled vehicle with power-operated mechanism for dispensing flowable material comprising a mobile frame having a pair of laterally spaced, ground-engaging wheels, a reservoir supported on the frame for carrying the material, a dispensing system communicating with the reservoir including pump mechanism for forcing material carried in the reservoir through the system, and power-transmitting means connecting the pair of wheels to said pump mechanism whereby the pump mechanism is powered by rotation of the wheels, the latter means comprising a pair of wheel shafts set end to end and each connected to one of said ground-engaging wheels, differential gearing connecting adjacent ends of said shafts including an epicyclic gear constrained to movement in an orbit about the axes of said shafts and movable on rotation of either of said shafts, and a drive shaft for the pump mechanism operatively connected to the epicyclic gear whereby orbital movement of the former produces actuation of the latter.

2. The devices of claim 1 wherein the differential gearing comprises a gear train connecting the epicyclic gear to said drive shaft and wherein said gear train includes a step-up gear producing a greater speed of rotation in said drive shaft than the orbital speed of said epicyclic gear.

3. The device of claim 1 wherein the wheel and drive shaft and the differential gearing are enclosed within shaft and transmission housings, respectively.

4. A trailer-type liquid applicator comprising a mobile trailer frame having a pair of lateral support wheels, a tank supported on the frame, transversely extending aligned wheel axles set end to end with their adjacent set of ends centrally of the support wheels and their outer ends connected to the support wheels, one to each of the support wheels, differential gearing interconnecting the adjacent set of ends of said wheel axles and including an epicyclic gear movable in an orbit about the axes of the wheel axles on rotation of the wheel axles, a drive shaft extending normally of said wheel axles and longitudinally of the trailer frame, said differential gearing having a gear train connecting the drive shaft and the epicyclic gear so that orbital movement of the latter produces rotation of the drive shaft, fluid conduit means connected to the tank for dispensing fluid from the tank, a pump for forcing fluid through the conduit means out of the tank, and means connecting the pump and drive shaft whereby rotation of the shaft produces actuation of the pump.

5. A trailer-type liquid applicator comprising a mobile trailer frame having a pair of lateral support wheels, an elongated tank extending longitudinally over the center of the frame and supported thereon, transversely extending aligned wheel axles set end to end with an adjacent set of ends centrally of the support wheels and connected at their outer ends to said support wheels, one to each of the support wheels, differential gearing interconnecting the adjacent set of ends of the wheel axles and including an epicyclic gear movable in orbit about the axes of the wheel axles on rotation of the wheel axles, a drive shaft extending normally of the wheel axles and longitudinally of the frame, said differential gearing having a gear train connecting the drive shaft and the epicyclic gear whereby orbital movement of the latter produces rotation of the drive shaft, a rotatable agitator mounted within the tank set with its rotation axis extending longitudinally of the tank and having a propeller shaft therefor extending outwardly from the tank substantially parallel to said drive shaft, fluid conduit means connected to the tank for dispensing fluid from the tank, a pump for forcing fluid through the conduit means out of the tank, said pump having an actuating shaft substantially parallel to said drive and propeller shafts, and drive chains connecting the propeller, drive and pump actuating shafts for simultaneous rotation.

6. A trailer-type liquid applicator comprising a mobile trailer frame and lateral support wheels therefor, an elongated tank supported on the frame and extending longitudinally substantially over its center, a rotatable agitator set with its rotation axis extending longitudinally of the tank and having a propeller shaft substantially parallel to the longitudinal axis of the trailer frame projecting outwardly of the tank, tank discharge conduit means communicating with the tank and a pump for forcing fluid from the tank through the conduit means, an actuating shaft for the pump substantially parallel to said propeller shaft and adjacent said propeller shaft, a drive shaft disposed centrally of the trailer frame and extending substantially parallel to its longitudinal axis and underneath the tank, means drivingly connecting one end of the drive shaft to the propeller and pump actuating shafts, means drivingly connecting the other end of the drive shaft to the wheels whereby rotation of the wheels rotates said drive shaft, the latter means including wheel shafts, one for each wheel, disposed end to end and with their outer ends connected to the wheels, and differential gearing connecting the wheel shafts and the drive shaft whereby the rotation speed of the drive shaft is equal to the algebraic mean of the rotation speeds of the wheel shafts.

7. The device of claim 6 wherein said wheel and drive shafts and said differential gearing are enclosed within shaft and transmission housings, respectively.

8. A trailer-type liquid applicator comprising a mobile trailer frame and lateral support wheels therefor, an elongated tank supported on the frame and extending longitudinally substantially over its center, a rotatable agitator set with its rotation axis extending longitudinally of the tank and having a propeller shaft substantially parallel to the longitudinal axis of the trailer frame projecting outwardly of the tank, tank discharge conduit means communicating with the tank and a pump for forcing fluid from the tank through the conduit means, an actuating shaft for the pump substantially parallel to said propeller shaft and adjacent said propeller shaft, a drive shaft disposed centrally of the trailer frame and extending substantially parallel to its longitudinal axis and underneath the tank, means drivingly connecting one end of the drive shaft to the propeller and pump actuating shafts, means drivingly connecting the other end of the drive shaft to the wheels whereby rotation of the wheels rotates said drive shaft, the latter means comprising a pair of wheel shafts set end to end, one connected to each of the wheels, and differential gearing connecting the adjacent ends of the shafts and including an epicyclic gear constrained to movement about the axes of the shafts, said differential gearing including a gear train connecting the epicyclic gear to the drive shaft having a step-up gear producing a greater speed of rotation in the drive shaft than the speed of orbital movement of the epicyclic gear.

9. A wheeled vehicle with power-operated mechanism for dispensing flowable material comprising a mobile frame having a pair of laterally spaced, ground-engaging wheels, a dispensing system carried by the frame and including pump mechanism for forcing material through the system, and power-transmitting means connecting the pair of wheels to said pump mechanism whereby the pump mechanism is powered by rotation of the wheels, said power-transmitting means comprising a pair of wheel shafts, one connected to each of the wheels, a drive shaft for the pump mechanism, and differential gearing connecting the wheel shafts and the drive shaft for the pump mechanism whereby the rotation speed of the drive shaft is equal to the algebraic mean of the rotation speeds of the wheel shafts.

References Cited in the file of this patent

UNITED STATES PATENTS

| 2,578,482 | Mindrup | Dec. 11, 1951 |
| 2,659,625 | Gramatky | Nov. 17, 1953 |